(12) United States Patent
Yang (10) Patent No.: US 11,386,428 B2
(45) Date of Patent: Jul. 12, 2022

(54) DUAL TRANSACTION METHOD AND SYSTEM BASED ON CENTRALIZATION AND DECENTRALIZATION

(71) Applicant: ADVANCED NEW TECHNOLOGIES CO., LTD., Grand Cayman (KY)

(72) Inventor: Xinying Yang, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 17/085,672

(22) Filed: Oct. 30, 2020

(65) Prior Publication Data

US 2021/0049601 A1 Feb. 18, 2021

Related U.S. Application Data

(63) Continuation of application No. PCT/CN2019/086757, filed on May 14, 2019.

(30) Foreign Application Priority Data

Aug. 7, 2018 (CN) .......................... 201810893269.5

(51) Int. Cl.
*G06Q 20/40* (2012.01)
(52) U.S. Cl.
CPC ......... *G06Q 20/401* (2013.01); *G06Q 20/405* (2013.01)
(58) Field of Classification Search
CPC .................. G06Q 20/401; G06Q 20/405
See application file for complete search history.

(56) References Cited

U.S. PATENT DOCUMENTS

| 8,332,286 | B1* | 12/2012 | Lopes | G06Q 10/06 |
| | | | | 705/30 |
| 10,719,816 | B1* | 7/2020 | Kurani | G06Q 20/401 |

(Continued)

FOREIGN PATENT DOCUMENTS

| CN | 105976231 A | 9/2016 |
| CN | 105976232 A | 9/2016 |

(Continued)

OTHER PUBLICATIONS

Patrick McCorry, Malte Moser, Siamak F. Shahandasti, and Feng Hao; "Towards Bitcoin Payment Networks;" dated Jul. 2016; https://eprint.iacr.org/2016/408.pdf (Year: 2016).*

(Continued)

*Primary Examiner* — Elda G Milef
*Assistant Examiner* — Raven E Zeer (57) ABSTRACT

Disclosed are a dual transaction method and system based on centralization and decentralization. In the embodiments of the present description, when a designated member node receives a transaction request, in one aspect, transaction feasibility verification is carried out for the transaction request, a designated resource amount is deducted from a virtual resource account corresponding to a spending user identifier after the request passes the verification, and the designated resource amount is added to a virtual resource account corresponding to a payment-receiving user identification; in another aspect, target transaction information is broadcasted to a block chain network according to the transaction request, so that each member node distributes the target transaction information to a block chain on the basis of a consensus mechanism after the block chain network performs transaction feasibility verification on the target transaction information.

20 Claims, 3 Drawing Sheets

(56) References Cited

U.S. PATENT DOCUMENTS

| | | | |
|---|---|---|---|
| 2005/0222928 A1* | 10/2005 | Steier | G06Q 40/00 |
| | | | 705/35 |
| 2015/0120539 A1* | 4/2015 | Amancherla | G06Q 20/40 |
| | | | 705/41 |
| 2015/0170112 A1 | 6/2015 | DeCastro | |
| 2015/0310424 A1 | 10/2015 | Myers et al. | |
| 2016/0337403 A1 | 11/2016 | Stoops et al. | |
| 2017/0221052 A1 | 8/2017 | Sheng et al. | |
| 2017/0230339 A1 | 8/2017 | Xie et al. | |
| 2017/0243025 A1 | 8/2017 | Kurian et al. | |
| 2017/0329980 A1 | 11/2017 | Hu et al. | |
| 2017/0344987 A1* | 11/2017 | Davis | H04L 9/30 |
| 2017/0359408 A1* | 12/2017 | Kurian | G06Q 10/06 |
| 2017/0366516 A1* | 12/2017 | Pattanaik | G06Q 20/382 |
| 2017/0372392 A1* | 12/2017 | Metnick | G06Q 30/0613 |
| 2018/0025181 A1 | 1/2018 | Barinov et al. | |
| 2018/0060836 A1 | 3/2018 | Castagna et al. | |
| 2018/0096175 A1* | 4/2018 | Schmeling | G06Q 10/08 |
| 2018/0130034 A1 | 5/2018 | Taylor et al. | |
| 2018/0219671 A1* | 8/2018 | Velissarios | H04L 9/3247 |
| 2018/0285217 A1 | 10/2018 | Smith et al. | |
| 2018/0300382 A1 | 10/2018 | Madisetti et al. | |
| 2018/0300693 A1* | 10/2018 | Gopinath | H04L 9/3228 |
| 2018/0308072 A1 | 10/2018 | Smith et al. | |
| 2019/0095879 A1* | 3/2019 | Eyal | G06Q 20/06 |
| 2019/0140935 A1 | 5/2019 | Kikinis | |
| 2019/0156301 A1 | 5/2019 | Bentov et al. | |
| 2019/0188701 A1 | 6/2019 | Parsons et al. | |
| 2019/0229918 A1 | 7/2019 | Naqvi et al. | |
| 2019/0311337 A1* | 10/2019 | Madisetti | G06Q 20/38215 |
| 2019/0319938 A1* | 10/2019 | Castinado | G06Q 20/3823 |
| 2019/0354977 A1 | 11/2019 | Tang | |
| 2020/0034456 A1 | 1/2020 | Montgomery-Recht et al. | |

FOREIGN PATENT DOCUMENTS

| | | | | |
|---|---|---|---|---|
| CN | 106327173 A | 1/2017 | | |
| CN | 106790431 A | 5/2017 | | |
| CN | 107180350 A | 9/2017 | | |
| CN | 107392040 A | 11/2017 | | |
| CN | 108022090 A | 5/2018 | | |
| CN | 108154367 A | 6/2018 | | |
| CN | 108171489 A | 6/2018 | | |
| CN | 108256859 A | 7/2018 | | |
| CN | 109242483 A | 1/2019 | | |
| TW | 201814605 A | 4/2018 | | |
| WO | 2017/109140 A1 | 6/2017 | | |
| WO | 2017/139112 A1 | 8/2017 | | |
| WO | WO-2017161417 A1 * | 9/2017 | | G06Q 20/0655 |

OTHER PUBLICATIONS

Joshua Lind; Oded Naor; Ittay Eyal; Florian Kelbert; Peter Pietzuch; Emin Gun Sirer; "Teechain: Reducing Storage Costs on the Blockchain With Offline Payment Channels;" Jun. 2018; Research Gate (Year: 2018).*

PCT International Search Report and the Written Opinion dated Jul. 31, 2019, issued in related International Application No. PCT/CN2019/086757, with partial English translation (9 pages).

Search Report dated Dec. 5, 2019, issued in related Taiwan Application No. 108108215 (1 page).

First Search dated Apr. 21, 2020, issued in related Chinese Application No. 201810893269.5 (1 page).

First Office Action dated Apr. 27, 2020, issued in related Chinese Application No. 201810893269.5, with English machine translation (12 pages).

Second Office Action dated Jul. 14, 2020, issued in related Chinese Application No. 201810893269.5, with English machine translation (16 pages).

Extended European Search Report for Application No. 19847837.2 dated May 21, 2021, 9 pages.

Christidis et al., "Blockchains and Smart Contracts for the Internet of Things", IEEE Access, Digital Object Identifier, May 10, 2016, 12 pages.

Written Opinion for Singaporean Application No. 11202010777V dated Mar. 15, 2022.

* cited by examiner

DUAL TRANSACTION METHOD AND SYSTEM BASED ON CENTRALIZATION AND DECENTRALIZATION

CROSS REFERENCE TO RELATED APPLICATIONS

The present application is a continuation application of the International Patent Application No. PCT/CN2019/086757, filed on May 14, 2019, and titled "DUAL TRANSACTION METHOD AND SYSTEM BASED ON CENTRALIZATION AND DECENTRALIZATION," which claims priority to Chinese Patent Application No. 201810893269.5 filed on Aug. 7, 2018. The entire contents of all of the above applications are incorporated herein by reference in their entirety.

TECHNICAL FIELD

Embodiments of this specification relate to the field of information technologies, and in particular, to a dual transaction method and system based on centralization and decentralization.

BACKGROUND

It is well-known that the blockchain technology is a decentralized distributed storage technology, and may implement multi-party attestation of data. This means that data stored in a blockchain is difficult to be tampered with and is reliable.

In practice, a blockchain transaction system may be built based on the blockchain technology. The blockchain transaction system is actually a blockchain network formed by a plurality of member nodes. Any member node may accept a transaction initiated by a user, and broadcast transaction information of the accepted transaction to the blockchain network, for member nodes to publish the transaction information to a blockchain based on a consensus mechanism after transaction validity verification (generally, whether a balance of a transfer-out party is sufficient is verified) performed by the blockchain network on the transaction information is successful. With that, the transaction is completed. In this way, attestation of each transaction is implemented.

However, the decentralization characteristic of blockchain transaction systems may cause delay in confirming transactions, which brings inconvenience to users.

SUMMARY

To resolve the delay problem of transaction confirmation in existing blockchain transaction systems, embodiments of this specification provide a dual transaction method and system based on centralization and decentralization, and the technical solutions are as follows:

According to a first aspect of the embodiments of this specification, a dual transaction method based on centralization and decentralization is provided, where a blockchain network includes a plurality of member nodes, a virtual resource account is registered by a user with a designated member node, and the method includes: receiving, by the designated member node, a transaction request including a paying user identifier of a paying user, a designated resource amount, and a receiving user identifier of a receiving user, the paying user being a user paying the designated resource amount, and the receiving user being a user receiving the designated resource amount; performing transaction feasibility verification on the transaction request, and after the verification is successful, deducting the designated resource amount from a virtual resource account corresponding to the paying user identifier and adding the designated resource amount to a virtual resource account corresponding to the receiving user identifier; and constructing, according to the transaction request, target transaction information including the paying user identifier, the designated resource amount, and the receiving user identifier, and broadcasting the target transaction information to the blockchain network, for the member nodes to publish the target transaction information to a blockchain based on a consensus mechanism after transaction feasibility verification performed by the blockchain network on the target transaction information is successful.

According to a second aspect of the embodiments of this specification, a dual transaction apparatus based on centralization and decentralization is provided, where a blockchain network includes a plurality of member nodes, the apparatus is any of the member nodes, a virtual resource account is registered by a user with the apparatus, and the apparatus includes: a receiving module, configured to receive a transaction request including a paying user identifier of a paying user, a designated resource amount, and a receiving user identifier of a receiving user, the paying user being a user paying the designated resource amount, and the receiving user being a user receiving the designated resource amount; a centralization processing module, configured to perform transaction feasibility verification on the transaction request, and after the verification is successful, deduct the designated resource amount from a virtual resource account corresponding to the paying user identifier and add the designated resource amount to a virtual resource account corresponding to the receiving user identifier; and a blockchain processing module, configured to construct, according to the transaction request, target transaction information including the paying user identifier, the designated resource amount, and the receiving user identifier, and broadcast the target transaction information to the blockchain network, for the member nodes to publish the target transaction information to a blockchain based on a consensus mechanism after transaction feasibility verification performed by the blockchain network on the target transaction information is successful.

According to a third aspect of the embodiments of this specification, a dual transaction system based on centralization and decentralization is provided, where the system includes a blockchain network formed by a plurality of member nodes, and a user can register a virtual resource account with a designated member node, where the designated member node receives a transaction request that is sent by a paying user and that includes a paying user identifier of the paying user, a designated resource amount, and a receiving user identifier of a receiving user, the paying user being a user paying the designated resource amount, and the receiving user being a user receiving the designated resource amount; performs transaction feasibility verification on the transaction request, and after the verification is successful, deducts the designated resource amount from a virtual resource account corresponding to the paying user identifier and adds the designated resource amount to a virtual resource account corresponding to the receiving user identifier; and constructs, according to the transaction request, target transaction information including the paying user identifier, the designated resource amount, and the receiving user identifier, and broadcasts the target transaction information to the blockchain network; and other member nodes and the designated member node publish the target transaction information to a blockchain after transaction feasibility verification performed by the blockchain network on the target transaction information is successful.

According to a fourth aspect of the embodiments of this specification, a dual transaction method based on centralization and decentralization, wherein a blockchain network comprises a plurality of member nodes, a virtual resource account is registered by a user with a designated member node, and the method comprises: receiving, by the designated member node, a transaction request comprising a paying user identifier of a paying user, a designated resource amount, and a receiving user identifier of a receiving user, the paying user being a user paying the designated resource amount, and the receiving user being a user receiving the designated resource amount; performing, by the designated member node, transaction feasibility verification on the transaction request off the blockchain network, and after the verification is successful, deducting the designated resource amount from a virtual resource account corresponding to the paying user identifier and adding the designated resource amount to a virtual resource account corresponding to the receiving user identifier; transmitting, by the designated member node, a confirmation message to a computing device of the paying user and/or a computing device of the receiving user, wherein the confirmation message confirms a successful transaction feasibility verification of the transaction request; and constructing, by the designated member node according to the transaction request, target transaction information comprising the paying user identifier, the designated resource amount, and the receiving user identifier, and broadcasting, by the designated member node, a blockchain transaction comprising the target transaction information and the confirmation message to the blockchain network, for the member nodes to publish the blockchain transaction to a blockchain based on a consensus mechanism after transaction feasibility verification performed by the blockchain network on the blockchain transaction is successful.

According to a fifth aspect of the embodiments of this specification, one or more non-transitory computer-readable storage media storing instructions executable by one or more processors, wherein execution of the instructions causes the one or more processors to perform operations comprising: receiving a transaction request comprising a paying user identifier of a paying user, a designated resource amount, and a receiving user identifier of a receiving user, the paying user being a user paying the designated resource amount, and the receiving user being a user receiving the designated resource amount, wherein a blockchain network comprises a plurality of member nodes, a virtual resource account is registered by a user with a designated member node; performing transaction feasibility verification on the transaction request off the blockchain network, and after the verification is successful, deducting the designated resource amount from a virtual resource account corresponding to the paying user identifier and adding the designated resource amount to a virtual resource account corresponding to the receiving user identifier; transmitting a confirmation message to a computing device of the paying user and/or a computing device of the receiving user, wherein the confirmation message confirms a successful transaction feasibility verification of the transaction request; and constructing, according to the transaction request, target transaction information comprising the paying user identifier, the designated resource amount, and the receiving user identifier, and broadcasting a blockchain transaction comprising the target transaction information and the confirmation message to the blockchain network, for the member nodes to publish the blockchain transaction to a blockchain based on a consensus mechanism after transaction feasibility verification performed by the blockchain network on the blockchain transaction is successful.

According to a sixth aspect of the embodiments of this specification, a system comprising one or more processors and one or more non-transitory computer-readable memories coupled to the one or more processors and configured with instructions executable by the one or more processors to cause the system to perform operations comprising: receiving a transaction request comprising a paying user identifier of a paying user, a designated resource amount, and a receiving user identifier of a receiving user, the paying user being a user paying the designated resource amount, and the receiving user being a user receiving the designated resource amount, wherein a blockchain network comprises a plurality of member nodes, a virtual resource account is registered by a user with a designated member node; performing transaction feasibility verification on the transaction request off the blockchain network, and after the verification is successful, deducting the designated resource amount from a virtual resource account corresponding to the paying user identifier and adding the designated resource amount to a virtual resource account corresponding to the receiving user identifier; transmitting a confirmation message to a computing device of the paying user and/or a computing device of the receiving user, wherein the confirmation message confirms a successful transaction feasibility verification of the transaction request; and constructing, according to the transaction request, target transaction information comprising the paying user identifier, the designated resource amount, and the receiving user identifier, and broadcasting a blockchain transaction comprising the target transaction information and the confirmation message to the blockchain network, for the member nodes to publish the blockchain transaction to a blockchain based on a consensus mechanism after transaction feasibility verification performed by the blockchain network on the blockchain transaction is successful.

In the technical solutions provided in the embodiments of this specification, a blockchain network includes a plurality of member nodes, and a virtual resource account is registered by a user with a designated member node. When receiving a transaction request, on one hand, the designated member node performs transaction feasibility verification on the transaction request, and after the verification is successful, deducts a designated resource amount from a virtual resource account corresponding to a paying user identifier and adds the designated resource amount to a virtual resource account corresponding to a receiving user identifier. On the other hand, the designated member node broadcasts target transaction information to the blockchain network according to the transaction request, for the member nodes to publish the target transaction information to a blockchain based on a consensus mechanism after transaction feasibility verification performed by the blockchain network on the target transaction information is successful. In this way, on one hand, a transaction between users can be quickly confirmed by a designated member node, which has an advantage of a centralized transaction mode. On the other hand, the transaction between users is also submitted to a blockchain network for verification, and is published by the member nodes to the blockchain based on a consensus mechanism (that is, the transaction is confirmed by the member nodes). Because the transaction has been quickly confirmed by the designated member node, even if the transaction confirmation speed in the blockchain network is low, no inconvenience is caused to users, and a feasible transaction is finally published to the blockchain for attestation.

It should be understood that the foregoing general description and detailed description in the following are merely exemplary and explanative, and cannot constitute a limitation to the embodiments of this specification.

In addition, any one of the embodiments of this specification does not need to achieve all the foregoing effects.

BRIEF DESCRIPTION OF THE DRAWINGS

To describe the technical solutions in the embodiments of this specification or in the existing technologies more clearly, the following briefly describes the accompanying drawings required for describing the embodiments or the existing technologies. Apparently, the accompanying drawings in the following description show merely some of the embodiments of this specification, and a person of ordinary skill in the art may still derive other drawings from the accompanying drawings.

DETAILED DESCRIPTION

In an existing blockchain transaction system, transaction information of transactions between users is broadcast to a blockchain network, and after feasibility verification performed by the blockchain network on the transaction information is successful, member nodes publish the transaction information to a blockchain. However, the existing blockchain transaction system is a decentralized distributed system, and a certain period of time is required for the member nodes to achieve a consensus of message consistency based on a consensus mechanism, which causes an excessively long time from initiating to confirming a transaction. That is, transaction confirmation has a delay in time, which causes inconvenience to users.

Therefore, in some embodiments, a dual transaction mechanism is introduced. When a transaction is initiated, transaction information is not only broadcast to the blockchain network, but also verified and settled in a timely manner by a member node accepting the transaction. In this way, the transaction is confirmed without a delay, and the transaction information is also published to the blockchain for attestation. For a user, the user may receive feedback that the transaction is quickly confirmed, or may find a reliable transaction information attestation record in the blockchain after the transaction.

To enable a person skilled in the art to better understand technical solutions in the embodiments of this specification, the technical solutions in the embodiments of this specification are described in detail below with reference to the accompanying drawings in the embodiments of this specification. Obviously, the described embodiments are only a part of the embodiments of this specification, other than all of the embodiments. Based on the embodiments in this specification, all other embodiments obtained by a person of ordinary skill in the art should fall within the protection scope.

The technical solutions provided in the embodiments of this specification are described in detail below with reference to the accompanying drawings.

Figure 1:
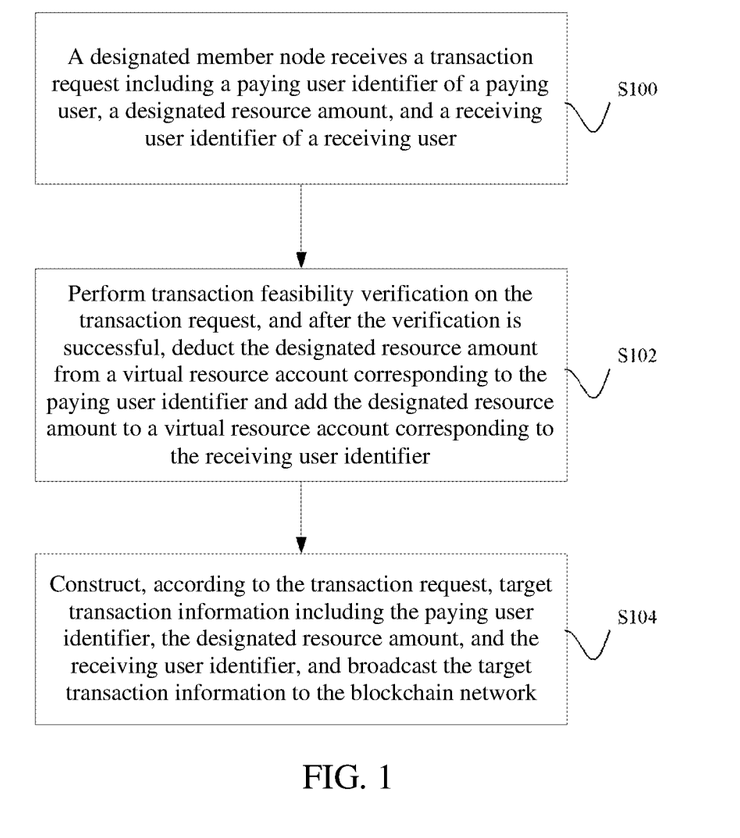
FIG. 1 is a schematic flowchart of a dual transaction method based on centralization and decentralization, according to some embodiments.

FIG. 1 is a schematic flowchart of a dual transaction method based on centralization and decentralization, according to some embodiments. The method includes the following steps:

S100. A designated member node receives a transaction request including a paying user identifier of a paying user, a designated resource amount, and a receiving user identifier of a receiving user.

In some embodiments, a blockchain network includes a plurality of member nodes. In this specification, a "node" may be one or more devices managed by a management party (a person or an institution), and management parties to which the member nodes respectively correspond may be different.

In some embodiments, a virtual resource account is registered by a user with the designated member node. The designated member node may be designated according to actual service needs. For example, assuming that the blockchain network is a consortium blockchain network formed by 10 financial institutions (including banks and electronic payment platforms), a member node managed by an electronic payment platform may be designated as a designated member node, and a virtual resource account is registered by a user with the electronic payment platform.

The virtual resource account registered by the user with the designated member node is actually maintained in a relational database of the designated member node.

A virtual resource described in this specification is not limited to an electronic currency, and may also be bonus points, a game currency, a virtual object, and the like. In short, a transaction may be performed between users by using any virtual resource as a transaction medium according to actual service rules.

In step S100, the designated member node may receive a transaction request sent by the paying user, or may receive a transaction request sent by the receiving user. The transaction request may include a paying user identifier of a paying user, a designated resource amount, and a receiving user identifier of a receiving user, the paying user being a user paying the designated resource amount, and the receiving user being a user receiving the designated resource amount.

S102. Perform transaction feasibility verification on the transaction request, and after the verification is successful, deduct the designated resource amount from a virtual resource account corresponding to the paying user identifier and add the designated resource amount to a virtual resource account corresponding to the receiving user identifier. In some embodiments, S102 may be performed by one or more designated member nodes off the blockchain network (e.g., in a centralized manner). This may expedite confirmation of the transaction request, as compared to the tradition confirmation in a decentralized manner by blockchain nodes of the blockchain network.

In this specification, the transaction feasibility verification refers to verifying whether a transaction is reasonable and executable, which mainly includes verifying whether an account balance of the paying user is sufficient. In addition, in practice, other items of the transaction may also be the subject of feasibility verification according to actual service rules, for example, whether the paying user has an authorization.

If the feasibility verification performed by the designated member node on the transaction request is successful, settlement is performed. That is, the designated resource amount is deducted from a virtual resource account corresponding to the paying user identifier and the designated resource amount is added to a virtual resource account corresponding to the receiving user identifier.

Further, after performing step S102, the designated member node may immediately send a transaction confirmation notification to the paying user and/or the receiving user. In some embodiments, the one or more designated member nodes may transmit a confirmation message to a computing device of the paying user and/or a computing device of the receiving user. The confirmation message may confirm a successful transaction feasibility verification of the transaction request and/or a successful settlement of the transaction request.

S104. Construct, according to the transaction request, target transaction information including the paying user identifier, the designated resource amount, and the receiving user identifier, and broadcast the target transaction information to the blockchain network. In some embodiments, the one or more designated member nodes may construct a blockchain transaction comprising the target transaction information and the confirmation message to the blockchain network, for the member nodes to publish the blockchain transaction to a blockchain based on a consensus mechanism after transaction feasibility verification performed by the blockchain network on the blockchain transaction is successful. This improves the computer functionality of the blockchain computer network system, because the computing burden on consensus verifying a blockchain transaction including the transaction request (which traditionally includes performing the transaction feasibility verification by the network of blockchain nodes in a decentralized manner) is reduced, and the computing speed of the blockchain computer network is improved (e.g., the transaction confirmation is done at the designated member node instead of having to wait for various blockchain nodes of the network to confirm). Further, the confirmation message may be included in the blockchain transaction added to the blockchain as proof of the successful transaction feasibility verification of the transaction request.

While step S102 is performed, or after step S102 is performed, the designated member node may perform step S104, for the member nodes to publish the target transaction information to a blockchain based on a consensus mechanism after transaction feasibility verification performed by the blockchain network on the target transaction information is successful. As shown above, the designated member node performed the transaction feasibility verification before the consensus verification phase of the blockchain transaction by the blockchain nodes of the blockchain network starts, such that during the consensus verification phase, the transaction feasibility verification no longer needs to be performed by the blockchain nodes of the blockchain network. The computing burden of the blockchain network is thus reduced, and the computing speed of the blockchain network is enhanced.

There may be a plurality of manners in which the blockchain network performs transaction feasibility verification on the target transaction information, and subsequently, the member nodes publish the target transaction information to a blockchain based on a consensus mechanism. This depends on a technical architecture used by the blockchain network.

For example, if the blockchain network uses a public chain architecture (such as Ethereum), after the designated member node broadcasts the target transaction information to the whole network, each member node receiving the target transaction information performs feasibility verification on the target transaction information. After the verification is successful, the member node stores the target transaction information in a cache (or referred to as a transaction pool) of the member node. Subsequently, after a consensus trigger condition is met (for example, after a designated period), a member node (which may be referred to as an accounting node) responsible for packing blocks is selected from the member nodes based on a consensus mechanism (such as a proof-of-work mechanism or a proof-of-stake mechanism). The accounting node retrieves several transaction information from a transaction pool of the accounting node, and packs the transaction information into a block. The accounting node, on one hand, stores the block into a copy of a blockchain at the accounting node, and on the other hand, broadcasts the block to the whole network, and other member nodes also store the block into the other member nodes' respective copies of the blockchain.

In another example, if the blockchain network uses a consortium blockchain architecture (such as Hyperledger), after the designated member node broadcasts the target transaction information to the whole network, a plurality of member nodes (generally referred to as endorsement nodes) responsible for endorsement first perform feasibility verification on the target transaction information. When a designated quantity of endorsement nodes confirm that the verification is successful, the endorsement nodes write the target transaction information into the tail of a transaction queue. A plurality of member nodes (generally referred to as confirmation nodes) responsible for confirmation may periodically retrieve a specified quantity of transaction information from the transaction queue sequentially from front to back, pack the transaction information into a block, and further publish the block to the blockchain based on a consensus mechanism (such as Practical Byzantine Fault Tolerance (PBFT)).

From the above, in some embodiments, for a transaction, the transaction is verified and settled based on a centralized mechanism to ensure transaction confirmation efficiency, and the transaction is also verified and settled based on a decentralized mechanism (that is, a blockchain technology) to implement attestation of the transaction.

Through the dual transaction method based on centralization and decentralization shown in FIG. 1, on one hand, a transaction between users can be quickly confirmed by a designated member node, which has an advantage of a centralized transaction mode. On the other hand, the transaction between users is also submitted to a blockchain network for verification, and is published by the member nodes to a blockchain based on a consensus mechanism (that is, the transaction is confirmed by the member nodes). Because the transaction has been quickly confirmed by the designated member node, even if a transaction confirmation speed in the blockchain network is low, no inconvenience is caused to users, and a feasible transaction is finally published to the blockchain for attestation.

Figure 2:
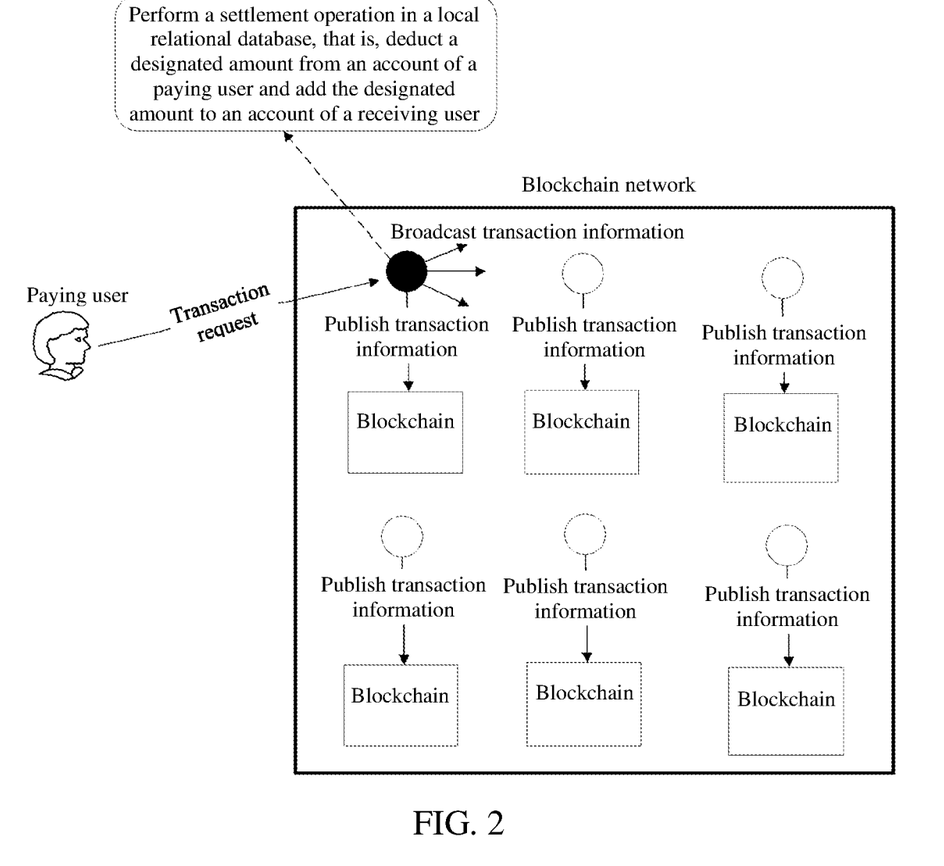
FIG. 2 is an exemplary flowchart of a dual transaction method based on centralization and decentralization, according to some embodiments.

FIG. 2 is an exemplary flowchart of a dual transaction method based on centralization and decentralization, according to some embodiments. As shown in FIG. 2, a blockchain network is formed by a plurality of member nodes (6 member nodes are shown in the figure). A solid circle is a designated member node, and hollow circles are other member nodes than the designated member node. A paying user may initiate a transaction, and send a transaction request to the designated member node. The designated member node, on one hand, performs a settlement operation in a local relational database, and on the other hand, broadcasts transaction information to the whole network, for the member nodes to publish the transaction information to a blockchain at the member nodes. It is worth emphasizing that, not only the designated member node needs to perform feasibility verification on the transaction, but also the blockchain network needs to perform feasibility verification on the transaction.

In some embodiments, an execution sequence of step S102 and step S104 is not limited. Step S104 may be performed after step S102 is performed, or step S102 may be performed after step S104 is performed, or step S102 and step S104 may be performed at the same time.

In addition, in some embodiments, for one transaction request, one transaction is performed respectively based on a centralized mechanism and a decentralized mechanism. Therefore, in fact, an account managed by the designated member node is a centralized account of a user, and the blockchain is actually a decentralized account of a user. In practice, for one user, a centralized account and a decentralized account of the user may be inconsistent. The cause of inconsistency may be that a balance of the centralized account is tampered with.

Therefore, the present application provides an account reconciliation method, to ensure a centralized account and a decentralized account of one user to be consistent.

For example, the designated member node may further locally store the target transaction information constructed in step S104 after the feasibility verification is successful. The designated member node may obtain transaction information published to the blockchain within a designated period as attestation transaction information, and obtain transaction information that is locally stored within the designated period as actual transaction information.

Based on this, the designated member node determines, for any user according to the attestation transaction information, a resource amount that needs to be received by the user within the designated period as an attestation received amount corresponding to the user, and determines, according to the actual transaction information, a resource amount actually received by the user within the designated period as an actually received amount corresponding to the user; compares the attestation received amount with the actually received amount; and corrects a balance of a virtual resource account of the user if a result of the comparison meets a first designated condition. There are at least the following several situations:

1. The first designated condition may be that the attestation received amount is greater than the actually received amount. Actually, in this situation, it is found that some incomes of the user are not added to the centralized account within the designated period. In this case, the designated member node may add a difference between the attestation received amount and the actually received amount to the virtual resource account of the user.

2. The first designated condition may alternatively be that the attestation received amount is less than the actually received amount. Actually, in this situation, it is found that the designated member node incorrectly adds some resource amounts to the centralized account of the user within the designated period. In this case, the designated member node may deduct a difference between the actually received amount and the attestation received amount from the virtual resource account of the user.

3. The first designated condition may alternatively be that the attestation received amount is greater than the actually received amount, and a ratio of a receiving difference to the attestation received amount is greater than a first designated ratio, the receiving difference being a difference between the attestation received amount and the actually received amount. Actually, in this situation, it is found that some incomes of the user are not added to the centralized account within the designated period, and the resource amounts that are not added to the centralized account are relatively large. In this case, the receiving difference may be added to the virtual resource account of the user, and a first compensation amount is determined, and is added to the virtual resource account of the user. The first compensation amount is actually a punishment for a management party of the designated member node. For example, the first compensation amount may be determined according to a formula: an attestation received amount*(a ratio of a receiving difference to the attestation received amount−a first designated ratio)*a punishment coefficient.

For example, assuming that the first designated ratio is 2%, the attestation received amount is 10000 yuan, and the actually received amount is 9700 yuan, the receiving difference is 300 yuan, and 300/10000=3%>2%. Therefore, the first compensation amount should be determined. Therefore, assuming that the punishment coefficient is 10, the first compensation amount is that 10000*(3%−2%)*10=1000 yuan.

In addition, the designated member node may also determine, for any user according to the attestation transaction information, a resource amount that needs to be paid by the user within the designated period as an attestation payment amount corresponding to the user, and determine, according to the actual transaction information, a resource amount actually paid by the user within the designated period as an actual payment amount corresponding to the user; compare the attestation payment amount with the actual payment amount; and correct a balance of a virtual resource account of the user if a result of the comparison meets a second designated condition.

There are at least the following several situations:

1. The second designated condition may be that the attestation payment amount is greater than the actual payment amount. Actually, in this situation, it is found that some payments of the user are not deducted from the centralized account within the designated period. In this case, the designated member node may deduct a difference between the attestation payment amount and the actual payment amount from the virtual resource account of the user.

2. The second designated condition may alternatively be that the attestation payment amount is less than the actual payment amount. Actually, in this situation, it is found that the designated member node incorrectly deducts some resource amounts from the centralized account of the user within the designated period. In this case, the designated member node may add a difference between the actual payment amount and the attestation payment amount to the virtual resource account of the user.

3. The second designated condition may alternatively be that the attestation payment amount is less than the actual payment amount, and a ratio of a payment difference to the attestation payment amount is greater than a second designated ratio, the payment difference being a difference between the actual payment amount and the attestation payment amount. Actually, in this situation, it is found that the designated member node incorrectly deducts some resource amounts from the centralized account of the user within the designated period, and the incorrectly deducted resource amounts are relatively large. In this case, the payment difference may be added to the virtual resource account of the user, and a second compensation amount is determined, and is added to the virtual resource account of the user. The second compensation amount is actually a punishment for a management party of the designated member node. For example, the second compensation amount may be determined according to a formula: an attestation payment amount*(a ratio of a payment difference to the attestation payment amount–a second designated ratio)*a punishment coefficient.

For example, assuming that the second designated ratio is 2%, the attestation payment amount is 10000 yuan, and the actual payment amount is 9700 yuan, the payment difference is 300 yuan, and 300/10000=3%>2%. Therefore, the second compensation amount should be determined. Therefore, assuming that the punishment coefficient is 10, the second compensation amount is that 10000*(3%–2%)*10=1000 yuan.

In addition, in some embodiments, a centralized account and a decentralized account of one user may be reconciled for each other. Generally, a balance of the decentralized account is more reliable, and the centralized account may be corrected according to the balance of the decentralized account. Sometimes, if there is a failure in the blockchain network, and the balance of the decentralized account is inaccurate, the balance of the decentralized account may also be corrected according to a balance of the centralized account.

Figure 3:
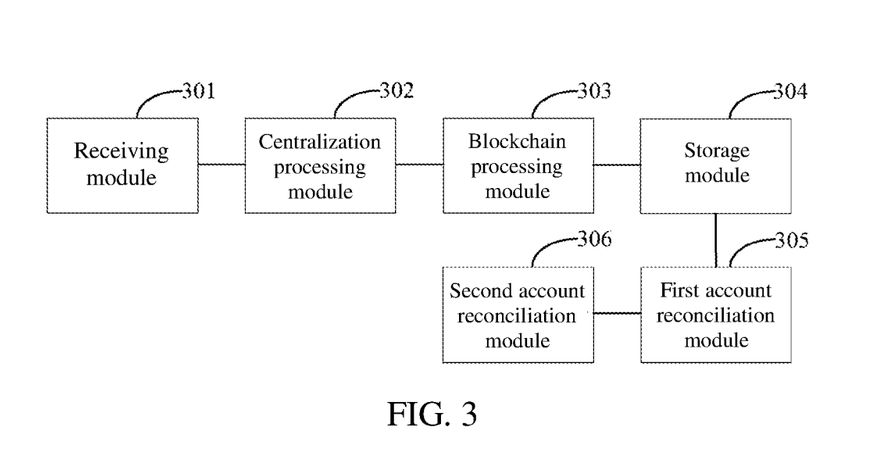
FIG. 3 is a schematic structural diagram of a dual transaction apparatus based on centralization and decentralization, according to some embodiments.

Based on the dual transaction method based on centralization and decentralization shown in FIG. 1, an embodiment further correspondingly provides a dual transaction apparatus based on centralization and decentralization. As shown in FIG. 3, a blockchain network includes a plurality of member nodes, the apparatus is any of the member nodes, a virtual resource account is registered by a user with the apparatus, and the apparatus includes: a receiving module 301, configured to receive a transaction request including a paying user identifier of a paying user, a designated resource amount, and a receiving user identifier of a receiving user, the paying user being a user paying the designated resource amount, and the receiving user being a user receiving the designated resource amount; a centralization processing module 302, configured to perform transaction feasibility verification on the transaction request, and after the verification is successful, deduct the designated resource amount from a virtual resource account corresponding to the paying user identifier and add the designated resource amount to a virtual resource account corresponding to the receiving user identifier; and a blockchain processing module 303, configured to construct, according to the transaction request, target transaction information including the paying user identifier, the designated resource amount, and the receiving user identifier, and broadcast the target transaction information to the blockchain network, for the member nodes to publish the target transaction information to a blockchain based on a consensus mechanism after transaction feasibility verification performed by the blockchain network on the target transaction information is successful.

The apparatus further includes: a storage module 304, configured to locally store the target transaction information after the transaction feasibility verification performed on the transaction request is successful.

The apparatus further includes: a first account reconciliation module 305, configured to obtain transaction information published to the blockchain within a designated period as attestation transaction information, and obtain transaction information that is locally stored within the designated period as actual transaction information; determine, for any user according to the attestation transaction information, a resource amount that needs to be received by the user within the designated period as an attestation received amount corresponding to the user, and determine, according to the actual transaction information, a resource amount actually received by the user within the designated period as an actually received amount corresponding to the user; compare the attestation received amount with the actually received amount; and correct a balance of a virtual resource account of the user if a result of the comparison meets a first designated condition.

The first designated condition is that the attestation received amount is greater than the actually received amount.

The first account reconciliation module 305 adds a difference between the attestation received amount and the actually received amount to the virtual resource account of the user.

The first designated condition is that the attestation received amount is less than the actually received amount.

The first account reconciliation module 305 deducts a difference between the actually received amount and the attestation received amount from the virtual resource account of the user.

The first designated condition is that the attestation received amount is greater than the actually received amount, and a ratio of a receiving difference to the attestation received amount is greater than a first designated ratio, the receiving difference being a difference between the attestation received amount and the actually received amount.

The first account reconciliation module 305 adds the receiving difference to the virtual resource account of the user; and determines a first compensation amount, and adds the first compensation amount to the virtual resource account of the user.

The apparatus further includes: a second account reconciliation module 306, configured to obtain transaction information published to the blockchain within a designated period as attestation transaction information, and obtain transaction information that is locally stored within the designated period as actual transaction information; determine, for any user according to the attestation transaction information, a resource amount that needs to be paid by the user within the designated period as an attestation payment amount corresponding to the user, and determine, according to the actual transaction information, a resource amount actually paid by the user within the designated period as an actual payment amount corresponding to the user; compare the attestation payment amount with the actual payment amount; and correct a balance of a virtual resource account of the user if a result of the comparison meets a second designated condition.

The second designated condition is that the attestation payment amount is greater than the actual payment amount.

The second account reconciliation module 306 deducts a difference between the attestation payment amount and the actual payment amount from the virtual resource account of the user.

The second designated condition is that the attestation payment amount is less than the actual payment amount.

The second account reconciliation module 306 adds a difference between the actual payment amount and the attestation payment amount to the virtual resource account of the user.

The second designated condition is that the attestation payment amount is less than the actual payment amount, and a ratio of a payment difference to the attestation payment amount is greater than a second designated ratio, the payment difference being a difference between the actual payment amount and the attestation payment amount.

The second account reconciliation module 306 adds the payment difference to the virtual resource account of the user; and determines a second compensation amount, and adds the second compensation amount to the virtual resource account of the user.

In some embodiments, the various modules of the apparatus in FIG. 3 may be implemented as software instructions or a combination of software and hardware. For example, the apparatus in FIG. 3 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the apparatus in FIG. 3 may include a server, a mobile phone, a tablet computer, a PC, a laptop computer, another computing device, or a combination of one or more of these computing devices.

Figure 4:
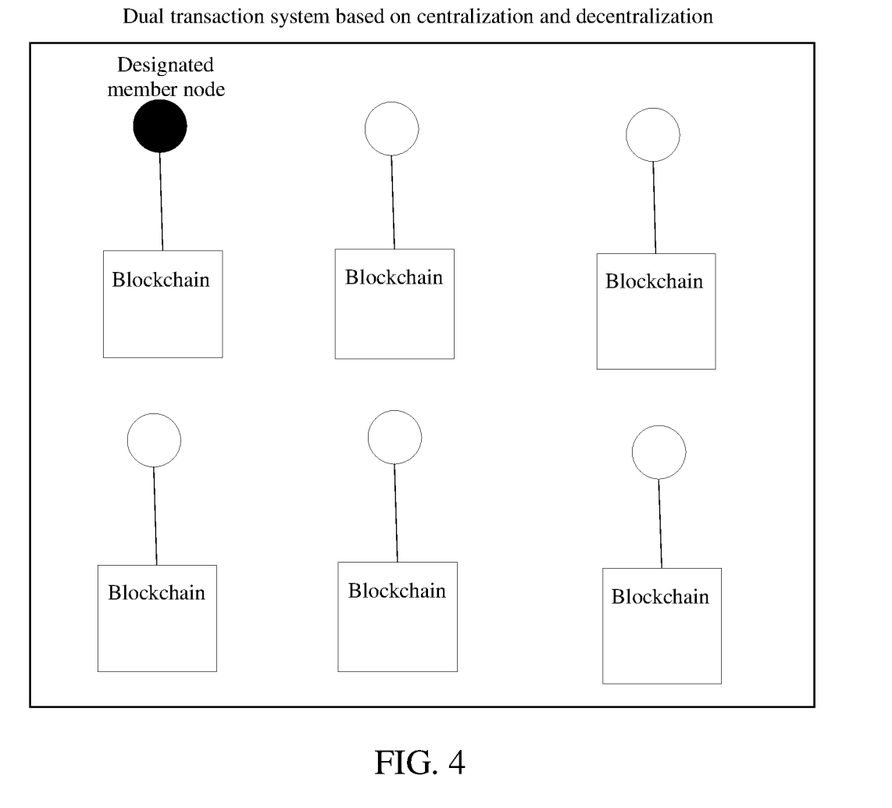
FIG. 4 is a schematic structural diagram of a dual transaction system based on centralization and decentralization, according to some embodiments.

Based on the dual transaction method based on centralization and decentralization shown in FIG. 1, an embodiment further correspondingly provides a dual transaction system based on centralization and decentralization. As shown in FIG. 4, the system includes a blockchain network formed by a plurality of member nodes, and a virtual resource is registered by a user account with a designated member node.

The designated member node (the solid node) receives a transaction request that is sent by a paying user and that includes a paying user identifier of the paying user, a designated resource amount, and a receiving user identifier of a receiving user, the paying user being a user paying the designated resource amount, and the receiving user being a user receiving the designated resource amount; performs transaction feasibility verification on the transaction request, and after the verification is successful, deducts the designated resource amount from a virtual resource account corresponding to the paying user identifier and adds the designated resource amount to a virtual resource account corresponding to the receiving user identifier; and constructs, according to the transaction request, target transaction information including the paying user identifier, the designated resource amount, and the receiving user identifier, and broadcasts the target transaction information to the blockchain network; and other member nodes (the hollow nodes) and the designated member node publish the target transaction information to a blockchain after transaction feasibility verification performed by the blockchain network on the target transaction information is successful.

In some embodiments, this specification further provides a computer device, where a blockchain network includes a plurality of member nodes, the device is any of the member nodes, and a virtual resource account is registered by a user with the device. The device includes at least a memory, a processor, and a computer program stored on the memory and executable on the processor. When executing the program, the processor implements functions of the method shown in FIG. 1.

Figure 5:
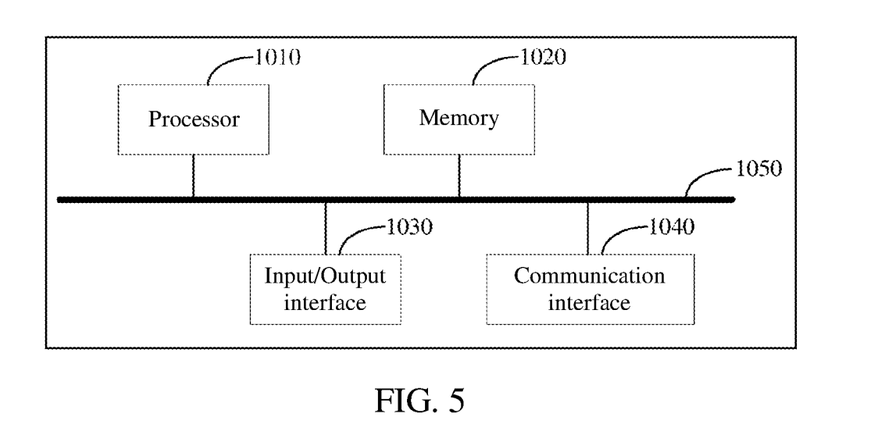
FIG. 5 is a schematic structural diagram of a computer device configured for performing the methods of the embodiments of this specification.

FIG. 5 is a schematic diagram of a more specific hardware structure of a computer device, according to some embodiments. The device may include: a processor 1010, a memory 1020, an input/output interface 1030, a communication interface 1040, and a bus 1050. The processor 1010, the memory 1020, the input/output interface 1030, and the communication interface 1040 communicate with and connect to each other inside the device by using the bus 1050.

The processor 1010 may be implemented in a manner of a general central processing unit (CPU), a microprocessor, an application-specific integrated circuit (ASIC), or one or more integrated circuits, and is configured to execute a related program to implement the technical solutions provided in the embodiments of this specification.

The memory 1020 may be implemented in a form of a read-only memory (ROM), a random access memory (RAM), a static storage device, or a dynamic storage device. The memory 1020 may store an operating system and another application program. When the technical solutions provided in the embodiments of this specification are implemented by means of software or firmware, related program code is stored in the memory 1020 and is executed by the processor 1010.

The input/output interface 1030 is configured to connect to an input/output module, to implement input and output of information. The input/output module may be used as a component and configured in the device (not shown in the figure), or may be externally connected to the device, to provide corresponding functions. An input device may include a keyboard, a mouse, a touchscreen, a microphone, and various sensors. An output device may include a display, a speaker, a vibrator, and an indicator.

The communication interface 1040 is configured to connect to a communication module (not shown in the figure), to implement communication interaction between the device and another device. The communication module may implement communication in a wired manner (such as a USB and a network cable), or may implement communication in a wireless manner (such as a mobile network, WiFi, and Bluetooth).

The bus 1050 includes a path, for transmitting information between the components (for example, the processor 1010, the memory 1020, the input/output interface 1030, and the communication interface 1040) of the device.

In some embodiments, although the foregoing device shows only the processor 1010, the memory 1020, the input/output interface 1030, the communication interface 1040, and the bus 1050, in a specific implementation process, the device may further include other components required by normal running. In addition, a person skilled in the art may understand that the device may alternatively include only components necessary for implementing the solution of this embodiment and not necessarily include all components shown in the figure.

An embodiment further provides a computer-readable storage medium storing a computer program. The program, when executed by a processor, implements functions of the method shown in FIG. 1.

The computer-readable medium includes a persistent medium and a non-persistent medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer readable medium does not include transitory computer readable media (transitory media), such as a modulated data signal and a carrier.

It may be learned from description of the foregoing implementations that, a person skilled in the art may clearly understand that the embodiments of this specification may be implemented by using software in addition to a necessary universal hardware platform. Based on such an understanding, the technical solutions of the embodiments of this specification essentially or the part contributing to the existing technologies may be implemented in a form of a software product. The computer software product may be stored in a storage medium, such as a ROM/RAM, a hard disk, or an optical disc, and includes a plurality of instructions for instructing a computer device (which may be a personal computer, a server, or a network device) to perform the methods described in the embodiments or some parts of the embodiments of this specification.

The system, the method, the module or the unit described in the foregoing embodiments may be, for example, implemented by a computer chip or an entity, or implemented by a product having a certain function. A typical implementation device is a computer, and the specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

In this specification, the embodiments are described in a progressive manner. Reference may be made to each other for a same or similar part of the embodiments. Each embodiment focuses on a difference from other embodiments. Especially, apparatus and device embodiments are basically similar to a method embodiment, and therefore are described briefly; for related parts, refer to partial descriptions in the method embodiment. The method embodiment described above is merely an example. The modules described as separate parts may or may not be physically separate. During implementation of the solutions of the embodiments of this specification, the function of the modules may be implemented in the same piece of or a plurality of pieces of software and/or hardware. A part or all of the modules may be selected according to actual needs to achieve the objectives of the solutions of the embodiments. A person of ordinary skill in the art may understand and implement this specification without creative efforts.

The foregoing descriptions are merely specific implementations of the embodiments of this specification. A person of ordinary skill in the art may make several improvements and modifications without departing from the principle of the embodiments of this specification and the improvements and modifications shall fall within the protection scope of the embodiments of this specification.

What is claimed is:

1. A dual transaction method based on centralization and decentralization, wherein a blockchain network comprises a plurality of member nodes, a centralized virtual resource account of a paying user and a centralized virtual resource account of a receiving user are registered with a designated member node, and the method comprises:
    receiving, by the designated member node, a transaction request comprising a paying user identifier of the paying user, a designated resource amount, and a receiving user identifier of the receiving user, the paying user being a user paying the designated resource amount, and the receiving user being a user receiving the designated resource amount;
    performing, by the designated member node, a first transaction feasibility verification on the transaction request off the blockchain network in a centralized manner, the first transaction feasibility verification comprising verifying whether a balance of the centralized virtual resource account corresponding to the paying user identifier is sufficient to provide the designated resource amount;
    after the first transaction feasibility verification is successful, settling, by the designated member node, in a local relational database, the transaction request by:
        deducting the designated resource amount from the centralized virtual resource account corresponding to the paying user identifier, and
        adding the designated resource amount to the centralized virtual resource account corresponding to the receiving user identifier;
    transmitting, by the designated member node to a computing device of the paying user and/or a computing device of the receiving user, a confirmation message of success of the first transaction feasibility verification and the settlement of the transaction request performed by the designated member node off the blockchain network and before target transaction information is published to a blockchain of the blockchain network;
    constructing, by the designated member node according to the transaction request, the target transaction information comprising the paying user identifier, the designated resource amount, and the receiving user identifier;
    after the settlement of the transaction request, broadcasting, by the designated member node, a blockchain transaction comprising the target transaction information and the confirmation message to the blockchain network; and
    publishing, by the members nodes, the blockchain transaction comprising the target transaction information and the confirmation message to the blockchain by performing a decentralized consensus mechanism with respect to the blockchain transaction, the decentralized consensus mechanism comprising performing a second transaction feasibility verification of the blockchain transaction in a decentralized manner.

2. The method according to claim 1, wherein the method further comprises:
    locally storing, by the designated member node, the target transaction information after the first transaction feasibility verification performed on the transaction request off the blockchain network is successful.

3. The method according to claim 2, wherein the method further comprises:

obtaining transaction information published to the blockchain within a designated period as attestation transaction information, and obtaining transaction information that is locally stored within the designated period as actual transaction information;

for either user of the paying user and the receiving user, determining, according to the attestation transaction information, a resource amount that needs to be received by either user within the designated period as an attestation received amount corresponding to either user, and determining, according to the actual transaction information, a resource amount actually received by either user within the designated period as an actually received amount corresponding to either user;

comparing the attestation received amount with the actually received amount; and correcting a balance of a virtual resource account of either user if a result of the comparison meets a first designated condition.

4. The method according to claim 3, wherein the first designated condition is that the attestation received amount is greater than the actually received amount; and correcting the balance of the virtual resource account of either user comprises:

adding a difference between the attestation received amount and the actually received amount to the virtual resource account of either user.

5. The method according to claim 3, wherein the first designated condition is that the attestation received amount is less than the actually received amount; and correcting the balance of the virtual resource account of either user comprises:

deducting a difference between the actually received amount and the attestation received amount from the virtual resource account of either user.

6. The method according to claim 3, wherein the first designated condition is that the attestation received amount is greater than the actually received amount, and a ratio of a receiving difference to the attestation received amount is greater than a first designated ratio, the receiving difference being a difference between the attestation received amount and the actually received amount; and correcting the balance of the virtual resource account of either user comprises:

adding the receiving difference to the virtual resource account of either user; and determining a first compensation amount, and adding the first compensation amount to the virtual resource account of either user.

7. The method according to claim 2, wherein the method further comprises:

obtaining transaction information published to the blockchain within a designated period as attestation transaction information, and obtaining transaction information that is locally stored within the designated period as actual transaction information;

for either user of the paying user and the receiving user, determining, according to the attestation transaction information, a resource amount that needs to be paid by either user within the designated period as an attestation payment amount corresponding to either user, and determining, according to the actual transaction information, a resource amount actually paid by either user within the designated period as an actual payment amount corresponding to either user;

comparing the attestation payment amount with the actual payment amount; and correcting a balance of a virtual resource account of either user if a result of the comparison meets a second designated condition.

8. The method according to claim 7, wherein the second designated condition is that the attestation payment amount is greater than the actual payment amount; and correcting the balance of the virtual resource account of either user comprises:

deducting a difference between the attestation payment amount and the actual payment amount from the virtual resource account of either user.

9. The method according to claim 7, wherein the second designated condition is that the attestation payment amount is less than the actual payment amount; and correcting the balance of the virtual resource account of either user comprises:

adding a difference between the actual payment amount and the attestation payment amount to the virtual resource account of either user.

10. The method according to claim 7, wherein the second designated condition is that the attestation payment amount is less than the actual payment amount, and a ratio of a payment difference to the attestation payment amount is greater than a second designated ratio, the payment difference being a difference between the actual payment amount and the attestation payment amount; and correcting the balance of the virtual resource account of either user comprises:

adding the payment difference to the virtual resource account of either user; and determining a second compensation amount, and adding the second compensation amount to the virtual resource account of either user.

11. The method of claim 1, wherein the first transaction feasibility verification further comprises verifying whether the paying user has authorization with respect to the transaction request.

12. One or more non-transitory computer-readable storage media storing instructions executable by one or more processors, wherein execution of the instructions causes the one or more processors to perform operations comprising:

receiving a transaction request comprising a paying user identifier of a paying user, a designated resource amount, and a receiving user identifier of a receiving user, the paying user being a user paying the designated resource amount, and the receiving user being a user receiving the designated resource amount, wherein a blockchain network comprises a plurality of member nodes, a centralized virtual resource account of the paying user and a centralized virtual resource account of the receiving user are registered with a designated member node;

performing a first transaction feasibility verification on the transaction request off the blockchain network in a centralized manner, the first transaction feasibility verification comprising verifying whether a balance of the centralized virtual resource account corresponding to the paying user identifier is sufficient to provide the designated resource amount;

after the first transaction feasibility verification is successful, settling, in a local relational database, the transaction request by:

deducting the designated resource amount from the centralized virtual resource account corresponding to the paying user identifier, and adding the designated resource amount to the centralized virtual resource account corresponding to the receiving user identifier;

transmitting to a computing device of the paying user and/or a computing device of the receiving user a confirmation message of success of the first transaction feasibility verification and the settlement of the transaction request performed by the designated member node off the blockchain network and before target transaction information is published to a blockchain of the blockchain network;

constructing, according to the transaction request, the target transaction information comprising the paying user identifier, the designated resource amount, and the receiving user identifier; and after the settlement of the transaction request, broadcasting a blockchain transaction comprising the target transaction information and the confirmation message to the blockchain network, for the member nodes to publish the blockchain based on a decentralized consensus mechanism with respect to the blockchain transaction, the decentralized consensus mechanism comprising performing a second transaction feasibility verification of the blockchain transaction in a decentralized manner.

13. The one or more non-transitory computer-readable storage media according to claim 12, wherein the operations further comprise:

locally storing the target transaction information after the first transaction feasibility verification performed on the transaction request off the blockchain network is successful.

14. The one or more non-transitory computer-readable storage media according to claim 13, wherein the operations further comprise:

obtaining transaction information published to the blockchain within a designated period as attestation transaction information, and obtaining transaction information that is locally stored within the designated period as actual transaction information;

for either user of the paying user and the receiving user, determining, according to the attestation transaction information, a resource amount that needs to be received by either user within the designated period as an attestation received amount corresponding to either user, and determining, according to the actual transaction information, a resource amount actually received by either user within the designated period as an actually received amount corresponding to either user;

comparing the attestation received amount with the actually received amount; and correcting a balance of a virtual resource account of either user if a result of the comparison meets a first designated condition.

15. The one or more non-transitory computer-readable storage media according to claim 14, wherein the first designated condition is that the attestation received amount is greater than the actually received amount; and correcting the balance of the virtual resource account of either user comprises:

adding a difference between the attestation received amount and the actually received amount to the virtual resource account of either user.

16. The one or more non-transitory computer-readable storage media according to claim 14, wherein the first designated condition is that the attestation received amount is less than the actually received amount; and correcting the balance of the virtual resource account of either user comprises:

deducting a difference between the actually received amount and the attestation received amount from the virtual resource account of either user.

17. The one or more non-transitory computer-readable storage media according to claim 14, wherein the first designated condition is that the attestation received amount is greater than the actually received amount, and a ratio of a receiving difference to the attestation received amount is greater than a first designated ratio, the receiving difference being a difference between the attestation received amount and the actually received amount; and correcting the balance of the virtual resource account of either user comprises:

adding the receiving difference to the virtual resource account of either user; and determining a first compensation amount, and adding the first compensation amount to the virtual resource account of either user.

18. The one or more non-transitory computer-readable storage media according to claim 13, wherein the operations further comprise:

obtaining transaction information published to the blockchain within a designated period as attestation transaction information, and obtaining transaction information that is locally stored within the designated period as actual transaction information;

for either user of the paying user and the receiving user, determining, according to the attestation transaction information, a resource amount that needs to be paid by either user within the designated period as an attestation payment amount corresponding to either user, and determining, according to the actual transaction information, a resource amount actually paid by either user within the designated period as an actual payment amount corresponding to either user;

comparing the attestation payment amount with the actual payment amount; and correcting a balance of a virtual resource account of either user if a result of the comparison meets a second designated condition.

19. The one or more non-transitory computer-readable storage media according to claim 18, wherein the second designated condition is that the attestation payment amount is greater than the actual payment amount; and correcting the balance of the virtual resource account of either user comprises:

deducting a difference between the attestation payment amount and the actual payment amount from the virtual resource account of either user.

20. A system comprising one or more processors and one or more non-transitory computer-readable memories coupled to the one or more processors and configured with instructions executable by the one or more processors to cause the system to perform operations comprising:

receiving a transaction request comprising a paying user identifier of a paying user, a designated resource amount, and a receiving user identifier of a receiving user, the paying user being a user paying the designated resource amount, and the receiving user being a user receiving the designated resource amount, wherein a blockchain network comprises a plurality of member nodes, a centralized virtual resource account of the paying user and a centralized virtual resource account of the receiving user are registered with a designated member node;

performing a first transaction feasibility verification on the transaction request off the blockchain network in a centralized manner, the first transaction feasibility verification comprising verifying whether a balance of the centralized virtual resource account corresponding to the paying user identifier is sufficient to provide the designated resource amount;

after the first transaction feasibility verification is successful, settling, in a local relational database, the transaction request by:
  deducting the designated resource amount from the centralized virtual resource account corresponding to the paying user identifier, and
  adding the designated resource amount to the centralized virtual resource account corresponding to the receiving user identifier;

transmitting to a computing device of the paying user and/or a computing device of the receiving user a confirmation message of success of the first transaction feasibility verification and the settlement of the transaction request performed by the designated member node off the blockchain network and before target transaction information is published to a blockchain of the blockchain network;

constructing, according to the transaction request, target transaction information comprising the paying user identifier, the designated resource amount, and the receiving user identifier; and after the settlement of the transaction request, broadcasting a blockchain transaction comprising the target transaction information and the confirmation message to the blockchain network, for the member nodes to publish the blockchain based on a decentralized consensus mechanism with respect to the blockchain transaction, the decentralized consensus mechanism comprising performing a second transaction feasibility verification of the blockchain transaction in a decentralized manner.

* * * * *